United States Patent
Kim et al.

(10) Patent No.: US 9,414,409 B2
(45) Date of Patent: Aug. 9, 2016

(54) METHOD AND APPARATUS FOR TRANSMITTING/RECEIVING DATA ON MULTIPLE CARRIERS IN MOBILE COMMUNICATION SYSTEM

(71) Applicant: Samsung Electronics Co. Ltd., Suwon-si, Gyeonggi-do (KR)

(72) Inventors: Soenghun Kim, Yongin-si (KR); Sangbum Kim, Suwon-si (KR); Jaehyuk Jang, Suwon-si (KR); Kyeongin Jeong, Suwon-si (KR); Jongsoo Choi, Pyeongtaek-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 105 days.

(21) Appl. No.: 13/759,359

(22) Filed: Feb. 5, 2013

(65) Prior Publication Data

US 2013/0201960 A1 Aug. 8, 2013

Related U.S. Application Data

(60) Provisional application No. 61/595,646, filed on Feb. 6, 2012, provisional application No. 61/600,179, filed on Feb. 17, 2012, provisional application No. 61/612,950, filed on Mar. 19, 2012, provisional application No. 61/620,957, filed on Apr. 5, 2012.

(30) Foreign Application Priority Data

Jan. 22, 2013 (KR) .......................... 10-2013-0006771

(51) Int. Cl.
*H04W 74/08* (2009.01)
*H04W 72/04* (2009.01)
(Continued)

(52) U.S. Cl.
CPC ...... *H04W 74/0833* (2013.01); *H04W 36/0072* (2013.01); *H04W 36/32* (2013.01);
(Continued)

(58) Field of Classification Search
CPC .. H04W 48/00; H04W 74/0833; H04W 24/00
USPC ................................... 370/331; 455/436, 441
See application file for complete search history.

(56) References Cited

U.S. PATENT DOCUMENTS

2009/0170498 A1 7/2009 Venkatasubramanian et al.
2010/0202288 A1* 8/2010 Park et al. .................... 370/230
(Continued)

FOREIGN PATENT DOCUMENTS

| WO | 2010/048178 A1 | 4/2010 |
| WO | 2011/121173 A1 | 10/2011 |
| WO | 2012/146825 A1 | 11/2012 |

OTHER PUBLICATIONS

3GPP TS 36.321 V8.2.0, Technical Specification Group Raido Access Network; Evolved Universal Terrestrial Radio Access (E-UTRA) Medium Access Control (MAC) protocol specification (Release 8), section 5.1.1-5.1.4, May 2008.*

(Continued)

*Primary Examiner* — Albert T Chou
(74) *Attorney, Agent, or Firm* — Jefferson IP Law, LLP

(57) ABSTRACT

A data transmission method and an apparatus to communicate data on multiple carriers in the mobile communication system are provided. A random access method of a terminal in a mobile communication system including primary and secondary cells operating on multiple carriers according to the present invention includes communicating data after random access in the primary cell, receiving, when the random access is triggered in the secondary cell, information for use in the secondary cell random access from the primary cell, transmitting a preamble in the secondary cell based on the received information, monitoring the primary cell to receive a Random Access Response for the secondary cell, and applying, when the Random Access Response for the secondary cell is received, the information carried in the Random Access Response to the secondary cell in which the preamble has been transmitted.

14 Claims, 11 Drawing Sheets

(51) Int. Cl.
  *H04W 36/32* (2009.01)
  *H04W 76/04* (2009.01)
  *H04W 36/00* (2009.01)
  *H04W 88/08* (2009.01)

(52) U.S. Cl.
  CPC ...... *H04W 72/0406* (2013.01); *H04W 72/0413* (2013.01); *H04W 72/0446* (2013.01); *H04W 76/046* (2013.01); *H04W 36/0077* (2013.01); *H04W 88/08* (2013.01)

(56) References Cited

U.S. PATENT DOCUMENTS

| | | |
|---|---|---|
| 2011/0021197 A1 | 1/2011 | Ngai |
| 2011/0249641 A1 | 10/2011 | Kwon et al. |
| 2012/0088509 A1* | 4/2012 | Yi .................................. 455/437 |
| 2013/0010711 A1* | 1/2013 | Larsson et al. ................ 370/329 |
| 2013/0079017 A1* | 3/2013 | Mach et al. .................... 455/441 |
| 2014/0023055 A1* | 1/2014 | Jeong et al. .................... 370/336 |
| 2014/0112254 A1* | 4/2014 | Lindoff et al. ................. 370/328 |
| 2014/0112276 A1* | 4/2014 | Ahn et al. ...................... 370/329 |
| 2014/0169323 A1* | 6/2014 | Park et al. ...................... 370/329 |
| 2014/0219204 A1* | 8/2014 | Park et al. ...................... 370/329 |

OTHER PUBLICATIONS

Alcatel-Lucent et al., RA Procedure on SCell, TSG-RAN WG2#77, R2-120603, Feb. 6-10, 2012, pp. 1-5, XP050565204, Sophia-Antipolis Cedex, France.

Ericsson et al., 3GPP TSG-RAN WG2 Meeting #77, R2-120470, Feb. 6-10, 2012, F-06921, Sophia-Antipolis Cedex, France.

3rd Generation Partnership Project; Technical Specification Group Radio Access Network; Evolved Universal Terrestrial Radio Access (E-UTRA); Medium Access Control (MAC) Protocol Specification (Release 10), 3GPP TS 36.321, V10.4.0, Dec. 1, 2011, XP055162646.

* cited by examiner

METHOD AND APPARATUS FOR TRANSMITTING/RECEIVING DATA ON MULTIPLE CARRIERS IN MOBILE COMMUNICATION SYSTEM

CROSS-REFERENCE TO RELATED APPLICATIONS

This application claims the benefit under 35 U.S.C. §119 (e) of a U.S. Provisional application filed on Feb. 6, 2012 in the U.S. Patent and Trademark Office and assigned Ser. No. 61/595,646, a U.S. Provisional application filed on Feb. 17, 2012 in the U.S. Patent and Trademark Office and assigned Ser. No. 61/600,179, a U.S. Provisional application filed on Mar. 19, 2012 in the U.S. Patent and Trademark Office and assigned Ser. No. 61/612,950, and a U.S. Provisional application filed on Apr. 5, 2012 in the U.S. Patent and Trademark Office and assigned Ser. No. 61/620,957, and under 35 U.S.C. §119(a) of a Korean patent application filed on Jan. 22, 2013 in the Korean Intellectual Property Office and assigned Serial No. 10-2013-0006771, the entire disclosure of each of which is hereby incorporated by reference.

BACKGROUND OF THE INVENTION

1. Field of the Invention

The present invention relates to a mobile communication system. More particularly, the present invention relates to a method and apparatus for transmitting/receiving data on multiple carriers in the mobile communication system.

2. Description of the Related Art

Mobile communication systems have developed to provide subscribers with mobile voice communication services. With the advance of technology, mobile communications have evolved to support high speed data communication services as well as the standard voice communication services.

Recently, as a next generation mobile communication system, a standard for Long Term Evolution (LTE) is being discussed by the 3rd Generation Partnership Project (3GPP). LTE is designed to provide a downlink speed of up to 100 Mbps.

More recent studies are focused on the LTE-Advanced (LTE-A) for improving data rate with the adaptation of several new techniques. Carrier Aggregation is one of the most distinct features of LTE-A. Unlike the a communication system using single uplink and single downlink carriers per User Equipment (UE), the carrier aggregation enables a UE to be scheduled on multiple carriers in both uplink and downlink.

By taking notice that a cell is configured with one downlink carrier and one uplink carrier, the carrier aggregation may be understood as if the UE communicates data via multiple cells. With the use of carrier aggregation, the maximum data rate increases in proportion to the number of aggregated carriers.

In the following description, if a UE receives data through a certain downlink carrier or transmits data through a certain uplink carrier, data is transmitted or received through control and data channels provided in a cell corresponding to center frequencies and frequency bands of the downlink and uplink carriers.

In the following description, carrier aggregation may be expressed in such a way that multiple serving cells are configured. The multiple serving cells include a Primary serving cell (PCell) and at least one Secondary serving Cell (SCell).

As used herein, the terms used to describe the embodiments of the present invention have the meanings as they do in LTE and as described in 3GPP TS36.331 and TS36.321.

The legacy technology-based UE performs random access only to the PCell. If the UE attempts random access only to the PCell, this may cause SCell uplink performance degradation of the UE. The UE is likely to fail uplink transmission in the SCells particularly when the PCell and SCells have different uplink transmission timings.

SUMMARY OF THE INVENTION

Aspects of the present invention are to address at least the above-mentioned problems and/or disadvantages and to provide at least the advantages described below. Accordingly, an aspect of the present invention is to provide a data transmission/reception method and apparatus that is capable of allowing the UE to perform random access in SCell as well as PCell, resulting in uplink performance improvement of SCell.

Another aspect of the present invention is to provide a data transmission/reception method and apparatus that is capable of allowing the UE to reuse the information acquired in the PCell random access for newly defined SCell random access procedure, resulting in reduction of UE's implementation complexity.

Another aspect of the present invention is to provide a data transmission/reception method and apparatus that is capable of allowing a UE to measure and validate its own mobility even in Radio Resource Control (RRC) connection release state and to notify the eNB of the mobility information when the RRC connection is reestablished.

In accordance with an aspect of the present invention, a random access method of a terminal in a mobile communication system including primary and secondary cells operating on multiple carriers is provided. The method includes communicating data after random access in the primary cell, receiving, when the random access is triggered in the secondary cell, information for use in the secondary cell random access from the primary cell, transmitting a preamble in the secondary cell based on the received information, monitoring the primary cell to receive a Random Access Response for the secondary cell, and applying, when the Random Access Response for the secondary cell is received, the information carried in the Random Access Response to the secondary cell in which the preamble has been transmitted.

In accordance with another aspect of the present invention, a terminal performing random access in a mobile communication system is provided. The terminal includes primary and secondary cells operating on multiple carriers includes a transceiver which communicates control information and data with at least one cell, and a controller which controls performing random access in the primary cell, receiving, when the random access is triggered in the secondary cell, information for use in the secondary cell random access from the primary cell, transmitting a preamble in the secondary cell based on the received information, monitoring the primary cell to receive a Random Access Response for the secondary cell, and applying, when the Random Access Response for the secondary cell is received, the information carried in the Random Access Response to the secondary cell in which the preamble has been transmitted.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention are described below with reference to the accompanying drawings.

Figure 1:
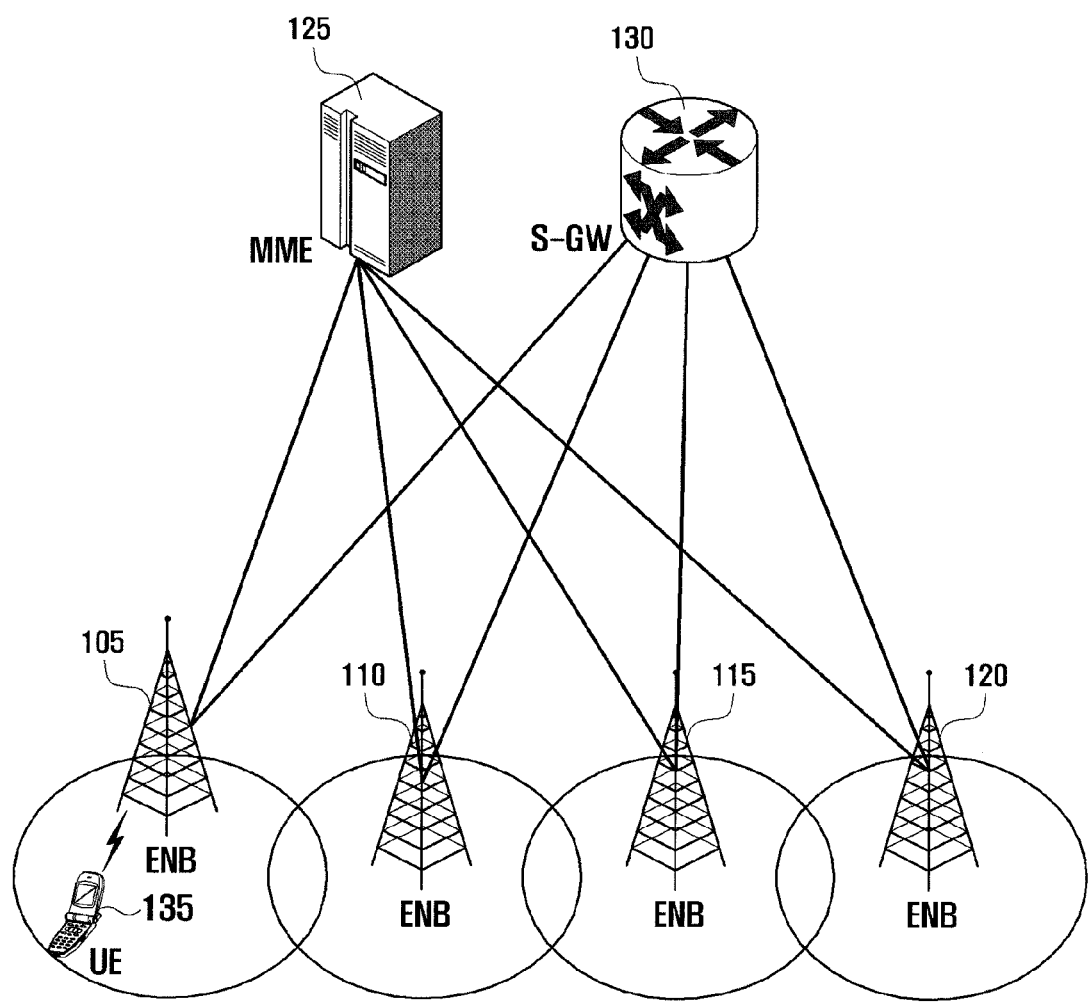
FIG. 1 is a diagram illustrating an architecture of a Long Term Evolution (LTE) system according to an exemplary embodiment of the present invention.

FIG. 1 is a diagram illustrating the architecture of a Long Term Evolution (LTE) system according to an exemplary embodiment of the present invention.

Referring to FIG. 1, the radio access network of the LTE system includes evolved Node Bs (eNBs) 105, 110, 115, and 120; a Mobility Management Entity (MME) 125; and a Serving-Gateway (S-GW) 130. The User Equipment UE) 135 connects to an external network via eNBs 105, 110, 115, and 120 and the S-GW 130.

The eNBs 105, 110, 115, and 120 correspond to legacy node Bs of Universal Mobile Communications System (UMTS). The eNBs 105, 110, 115, and 120 allow the UE establish a radio link and are responsible for complicated functions as compared to the legacy node B.

In the LTE system, all the user traffic including real time services such as Voice over Internet Protocol (VoIP) are provided through a shared channel. Accordingly, there is a need of a device located in the eNB to schedule data based on the state information such as UE buffer conditions, power headroom state, and channel state. In order to meet a data rate of up to 100 Mbps, the LTE system adopts Orthogonal Frequency Division Multiplexing (OFDM) as a radio access technology.

The LTE system also adopts Adaptive Modulation and Coding (AMC) to determine the modulation scheme and channel coding rate in adaptation to the channel condition of the UE. The AMC is a technique for determining the modulation scheme and channel coding rate for the channel condition.

The S-GW 130 is an entity to provide data bearers so as to establish and release data bearers under the control of the MME 125. The MME 125 is responsible for various control functions and connected to a plurality of eNBs 105, 110, 115, and 120.

Figure 2:
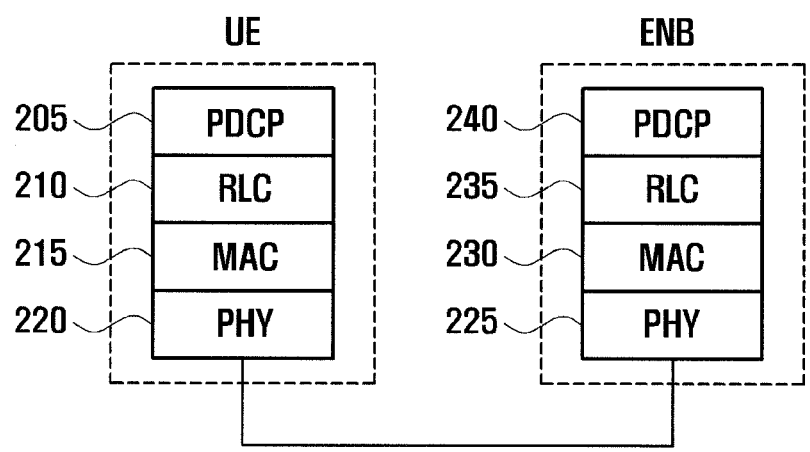
FIG. 2 is a diagram illustrating a protocol stack of an LTE system according to an exemplary embodiment of the present invention.

FIG. 2 is a diagram illustrating a protocol stack of the LTE system according to an exemplary embodiment of the present invention.

Referring to FIG. 2, the protocol stack of the LTE system includes Packet Data Convergence Protocol (PDCP) 205 and 240, Radio Link Control (RLC) 210 and 235, Medium Access Control (MAC) 215 and 230, and Physical (PHY) 220 and 225.

The PDCP 205 and 240 is responsible for IP header compression/decompression. The RLC 210 and 235 is responsible for segmenting the PDCP Protocol Data Unit (PDU) into segments in an appropriate size for Automatic Repeat Request (ARQ) operation.

The MAC 215 and 230 is responsible for establishing connection to a plurality of RLC entities so as to multiplex the RLC PDUs into MAC PDUs and demultiplex the MAC PDUs into RLC PDUs. The MAC PDUs are delivered to the PHY 220 and 225. The MAC 215 and 230 demultiplexes the MAC PDUs from the PHY 220 and 225 into RLC PDUs and delivers the RLC PDUs to corresponding RLC entities.

The PHY 220 and 225 performs channel coding on the MAC PDU and modulates the MAC PDU into OFDM symbols to transmit over radio channel or performs demodulating and channel-decoding on the received OFDM symbols and delivers the decoded data to the higher layer.

Figure 3:
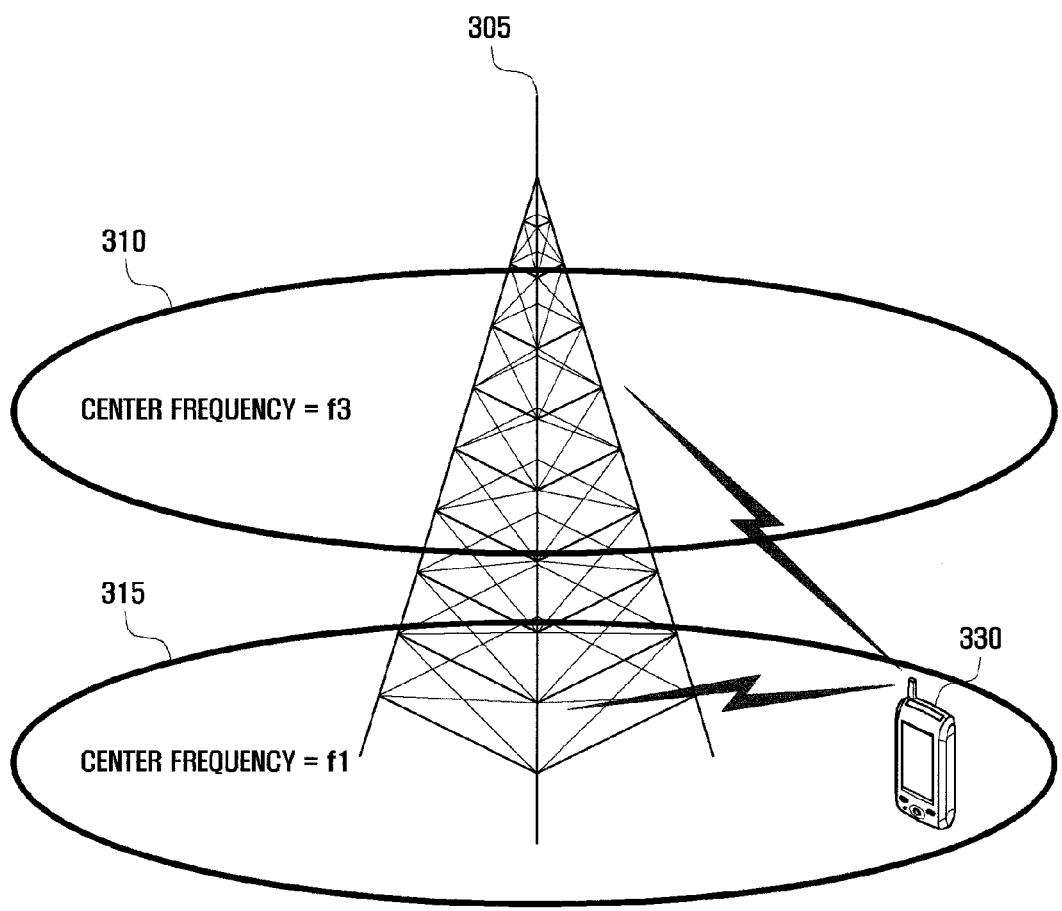
FIG. 3 is a diagram illustrating an exemplary situation of carrier aggregation in a mobile communication system according to an exemplary embodiment of the present invention.

FIG. 3 is a diagram illustrating an exemplary situation of carrier aggregation in the mobile communication system according to an exemplary embodiment of the present invention.

Referring to FIG. 3, typically an eNB is capable of transmitting and receiving signals to and from the UE 330 on multiple carriers across different frequency bands. For example, the eNB 305 may be configured to use the carrier 315 with center frequency f1 and the carrier 3210 with center frequency f3. If carrier aggregation is not supported, the UE 330 has to transmit/receive data unit one of the carriers 310 and 315. However, the UE 330 capable of carrier aggregation can transmit/receive data using both of the carriers 310 and 315.

The eNB 305 is capable of increasing the amount of the resource to be allocated to the UE 330 capable of carrier aggregation according to the channel condition of the UE 330 to increase the data rate.

Unlike the example shown in FIG. 3, the eNB may be configured with Remote Radio Heads (RRHs) that are distributed to transmit and receive signals at a location geographically far from the eNB. The uplink timings of the serving cell may be set to center around the eNB and the cells defined by the RRHs.

If the UE is configured with SCell having a coverage area different from that of the PCell and thus required to set a different uplink transmission timing, it is necessary for the UE to perform random access procedure in the corresponding SCell for determining the uplink transmission timing of the SCell.

Exemplary embodiments of the present invention propose a method and apparatus for performing SCell random access to set a SCell uplink transmission timing different from the PCell uplink transmission timing which has been set already.

Figure 4:
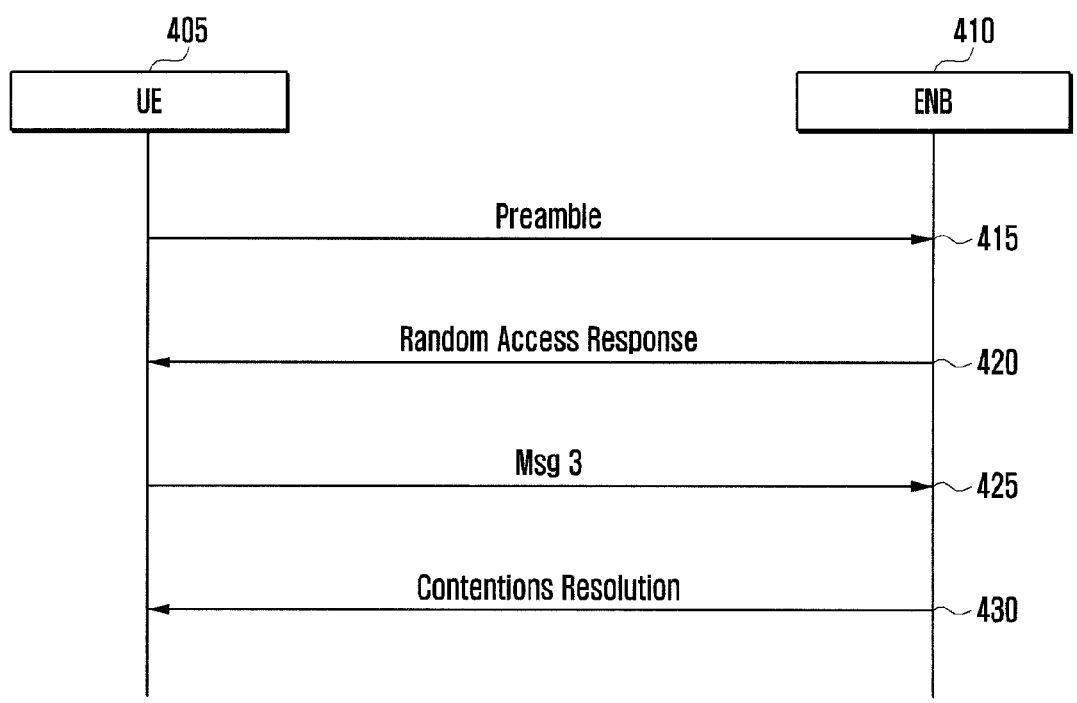
FIG. 4 is a signal flow diagram illustrating a random access procedure according to an exemplary embodiment of the present invention.

FIG. 4 is a signal flow diagram illustrating a random access procedure according to an exemplary embodiment of the present invention.

Referring to FIG. 4, the random access procedure includes 4 steps of transmitting a preamble, receiving a Random Access Response, transmitting message 3, and contentions resolution. The last two steps may be omitted depending on the case.

If a random access is triggered by a certain reason, the UE 405 determines the preamble transmission timing, transmission resource (frequency and time resources), and preamble to be transmitted by taking notice of the random access transmission resource information of the cell in which the random access is to be performed. The UE sends the eNB 410 the preamble at the preamble transmission power calculated based on the current channel condition, e.g. path loss, at step 415.

Upon receipt of the preamble transmitted by the UE, the eNB 410 generates and sends a Random Access Response message to the UE 405 at step 420. The Random Access Response message includes UE's uplink transmission timing adjustment command (Timing Advance (TA)) or uplink transmission resource information (Uplink (UL) grant) for message 3 transmission.

Upon receipt of the Random Access Response message, the UE 405 sends the eNB 410 the message 3 at step 425. The message 3 includes UE identifier such that upon receipt of the message 3 the eNB send the UE a response which is referred to as Contentions Resolution at step 430. If the eNB 410 does not receive the preamble, the Random Access Response message is not transmitted such that the UE 405 also does not receive the Random Access Response message. After a predetermined time has elapsed, the UE 405 retransmits the preamble at a power increased as much as predetermined amount as a part of uplink power control.

The random access procedure may be performed for various reasons. For example, the UE 405 may initiate the random access to request the eNB 410 for scheduling or to establish or reestablish the RRC connection. The UE 405 is also capable of initiating the random access to the target cell after handover.

In the aforementioned cases, it is preferred for the UE 405 to initiate the random access in the PCell. In the case of attempting SCell uplink transmission timing configuration as described above, however, the random access should be initiated in the corresponding SCell.

According to an exemplary embodiment of the present invention, the eNB controls whether to initiate a SCell random access unlike the PCell random access. According to exemplary embodiments of the present invention, the UE is prevented from initiating SCell random access voluntarily in order to maintain the random access load of the SCell at an appropriate level and to initiate the UE's random access at a timing indicated by the eNB.

Figure 5:
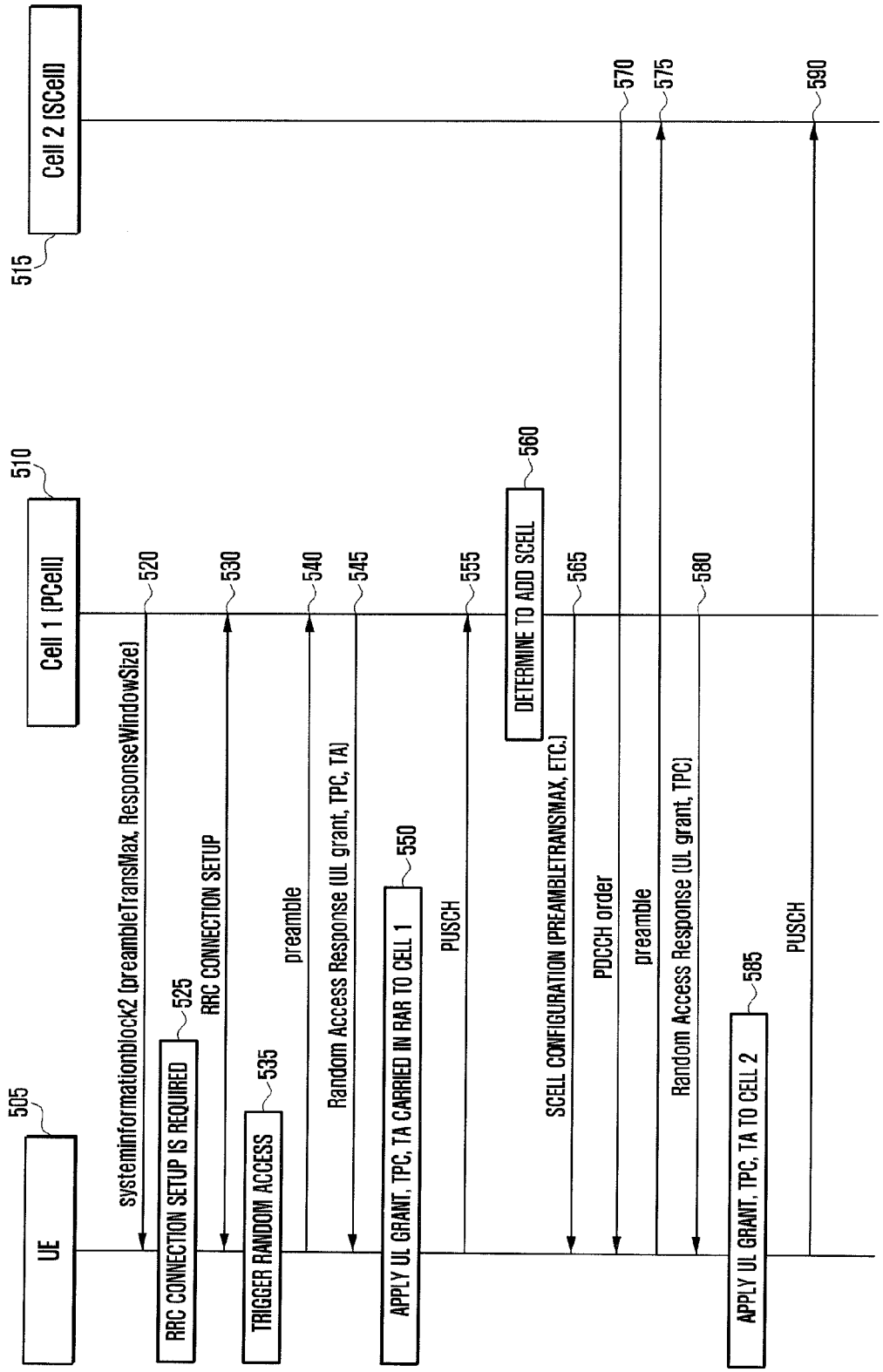
FIG. 5 is a signal flow diagram illustrating a random access procedure between a User Equipment (UE) and an evolved Node B (eNB) according to an exemplary embodiment of the present invention.

FIG. 5 is a signal flow diagram illustrating a random access procedure between a UE and an eNB according to an exemplary embodiment of the present invention.

Referring to FIG. 5, the UE 505 having no RRC connection selects the cell 1 510 according to predetermined criteria among plural connectable cells and acquires system information from the sell 1 at step 520. The system information is broadcast in the control message referred to as system information block (systeminformationblock) so as to be received by the UEs selected the corresponding cell. The system information block 2 (systeminformationblock2) includes the following information necessary for the UE to perform random access in the corresponding cell. The random access-related information includes:

Maximum preamble transmission times (preambleTransMax): maximum number of preamble transmission times allowed until the UE take a predetermined action while perform random access. The predetermined action can be RRC connection reestablishment operation. The eNB sets preambleTransMax to an appropriate value to prevent the preamble transmission from repeating infinitely.

Random Access Response window size (ra-ResponseWindowSize): The random access response window (ra-window) is a time duration monitoring the Physical Downlink Control Channel (PDCCH) in order for the UE to receive a Random Access Response (RAR) message. If the UE fails to receive a valid random access response message until the Random Access Response window expires, the UE is capable of retransmitting the preamble.

Random access transmission resource information: For example, the information on the subframe allowing the UE to transmit the preamble, information on the frequency resource, and information about the preamble format.

The UE takes an action which is supposed to be taken in the case where the RRC connection has not been established in the cell 1, e.g. monitoring the paging channel and measuring neighbor cells.

In this state, if an RRC connection setup is triggered at a certain timing (e.g. the UE receives a paging signal or data or control message to be transmitted) is generated at step 525, the UE establishes an RRC connection with the cell 1 at step 530.

The eNB allocates Signaling Radio Bearer (SRB) for exchanging RRC control message between the UE and the eNB and Data Radio Bearer (DRB) for exchanging user data between the UE and the eNB to communicate downlink and uplink data with the UE using the radio bearers.

If the random access is triggered by a certain reason at a certain timing at step 535, e.g. if the eNB instructs the UE to initiate random access or if the UE needs to request the eNB for transmission resource, the UE determines the preamble for transmitting the preamble based on the random access-related information acquired from the system information block 2 (systeminformationblock2) and transmits the preamble at step 540.

For example, if the UE transmits the preamble at uplink subframe n, the Random Access Response window starts at downlink subframe n+m. The UE monitors to receiving a Random Access Response message for the Random Access Response window. m is a value defined in the standard and set to be 2 or 3.

The UE monitors PDCCH to detect the scheduling of an identifier mapped to the transmission resource with which the preamble has been transmitted, determines whether the received random access response includes the identifier mapped to the preamble in the header, and if so saves the uplink transmission resource allocation information (UL grant), Transmission Power Control (TPC), and uplink transmission time adjustment information (Timing Advance or TA) contained in the valid random access response message at step 545.

If no valid Random Access Response message (RAR) is received until the Random Access Response window expires, the UE retransmits the preamble. The number of preamble retransmission times is limited by the preambleTransMax included in the system information block 2, and if the random access fails even with the preambleTransMax preamble transmissions, the UE determines that a significant problem has occurred and initiates RRC connection reestablishment procedure.

The UE applies at least one of the uplink transmission resource allocation information (UL grant), Transmission Power Control (TPC), and uplink transmission time adjustment information (Timing Advance or TA) carried in the valid random access response message to uplink transmission in the first serving cell at step 550.

The UE adjusts the transmission start timing of the uplink subframe n of the first serving cell to precede the start timing (start boundary) of the downlink subframe n of the first serving cell as much as TA, increases or decreases the uplink transmission power as much as the amount indicated by TPC, and selects uplink transmission resource of the first serving cell.

The UE performs uplink transmission at step 555. The UE selects the serving cell in which the RAR has been received as the first serving cell.

If carrier aggregation is not configured for the UE, if carrier aggregation is configured but only one serving cell has uplink, or if carrier aggregation is configured with plural serving cells but only one serving cell is allowed for random access, there is no need for a criteria to determine the cell to which the information carried in the RAR is applied. According to an exemplary embodiment of the present invention, the cell in which the RAR has been received is selected as the serving cell to which the information carried in the RAR is applied.

The UE performs Physical Uplink Shared Channel (PUSCH) transmission in the cell 1 by applying the UL grant of the RAR at step 555. Typically, the synchronous Hybrid Automatic Repeat Request (HARQ) process is applied to the PUSCH transmission. In the synchronous HARQ transmission, if a HARQ NACK is received, the sender performs retransmission using the same transmission resource as the previous transmission.

In this case, the UE is capable of performing HARQ transmission maximum retransmission times of maxHARQ-Tx and, if the HARQ transmission fails till then, stops transmission of the PUSCH. The maxHARQ-Tx is the value for preventing the PUSCH transmission of one MAC PDU from repeating infinitely and preferably set per UE according to whether the UE channel status considered by the eNB scheduler and delay sensitivity of the service configured for the UE.

The UE is provided with the following three types of maxHARQ-Tx parameters:

First maxHARQ-Tx: parameter the UE acquires through systeminformationblock2 of the serving cell Second maxHARQ-Tx: parameter the UE acquires through dedicated RRC control message such as RRC connection setup message (RRCConnectionSetup) in the RRC connection setup procedure in PCell Third maxHARQ-Tx: parameter the UE acquires through dedicated RRC control message such as RRC Connection Reconfiguration message (RRCConnectionReconfiguration) in the procedure of adding SCell configured with uplink If the preamble transmitted at step 540 is the dedicated preamble, the UE performs PUSCH transmission by applying the second maxHARQ-Tx at step 555. If the preamble transmitted at step 540 is a random preamble selected by the UE, the UE performs PUSCH transmission by applying the first maxHARQ-Tx. If the dedicated preamble is applied, then the eNB knows the UE at the PUSCH transmission timing; and if the random preamble is applied, then the eNB does not know the UE at the PUSCH transmission timing.

Although described below, the UE applies the third maxHARQ-Tx to the PUSCH transmission using the UL grant acquired in the SCell random access procedure.

The UE performs downlink data reception and uplink data transmission according to the above described principle in the cell 1.

If the data amount for the UE increases, the eNB controlling the cell 1 is capable of determining increase of the data rate by adding SCell to the UE. The eNB controlling the cell 1 determines to add a SCell for the UE at step 560.

In this case, if the location of the transmission/reception device of the SCell to be newly added differs from that of the PCell, e.g. if the PCell is a macro cell and the SCell is of an RRH, the eNB provides the UE with SCell configuration information and the information necessary for performing random access in the SCell at step 565.

According to an exemplary embodiment of the present invention, the eNB provides the UE with a part rather than whole of the SCell random access-related information so as to reuse the information used in the PCell. For example, the UE receives the maximum preamble transmission times (preambleTransMax) and random access transmission resource informations for use in the SCell but reuses the random access response window size (ra-ResponseWindowSize) used in the PCell. This is because the preambleTransMax and the random access transmission resource information are parameters for controlling preamble transmission that are preferred to be set to the values dedicated to the corresponding serving cell. ra-ResponseWindowSize is the parameter related to the serving cell for receiving RAR rather than the serving cell transmitted the preamble and thus it is preferred to reuse the value defined for use in the PCell.

The UE receives a PDCCH order instructing to initiate random access procedure at step 570. The PDCCH order is a command instructing a UE to initiate random access in a certain cell and is specified in TS36.211. The PDCCH order is transmitted/received in Downlink Control Information (DCI) format 1A, and CRC is scrambled with C-RNTI of the corresponding UE. Each field is coded as shown in Table 1.

TABLE 1

| PDCCH field | Size (bit) | Value |
|---|---|---|
| Flag for format0/format1A differentiation | 1 | 1 |
| Localized/Distributed VRB assignment flag | 1 | 0 |
| RB assignment | 5~13 | all 1 |
| Preamble index | 6 | Index of preamble to be used by UE in random access procedure |
| PRACH mask index | 4 | PRACH mask index to be applied in random access procedure |
| remaining | 3 or 4 | all 0 |

If the PDCCH order is received at subframe [n], the UE transmits the preamble at subframe [n+x1] in cell 2 with the application of the preamble index at step 575. Here, x1 is an integer greater than x and corresponds to the first valid Physical Random Access Channel (PRACH) occasion since [n+x]. x is the time necessary to take an action for transmitting the preamble and defined as a relatively great value in consideration of the low-end UE lack in processing capability. In the current standard, this value is defined to be set to 6. The valid PRACH occasions denotes the PRACH occasions allowed for UE's preamble transmission among the PRACH occasions defined by the PRACH configuration information and are indicated by the PRACH mask index. Since the PRACH mask index is specified in TS36.321 and TS36.213, a detailed description thereof is omitted.

After transmitting the random access preamble in the SCell, the UE monitors PDCCH of the PCell to determine whether RAR is received in the ra-Window. The window size is set to the random access response window (ra-ResponseWindowSize) acquired for use in PCell at step 520.

Typically, if a preamble is transmitted in a SCell, it is much intuitive to receive the RAR in the SCell. The RAR is addressed with a specific identifier, i.e. RA-RNTI, unlike user data. In this case, the UE should monitor to detect RA-RNTI as well as C-RNTI to receive RAR in the SCell in the SCell, and this increases the UE complexity. However, if the RAR reception is restricted to the PCell, what is to be monitored by the UE in the SCell is only the C-RNTI such that it is possible to avoid the increase of the UE complexity.

The UE according to an exemplary embodiment of the present invention is characterized in that although a preamble has been transmitted in a SCell the UE monitors the PDCCH of the PCell to receive the RAR with RA-RNTI during the ra-Window defined by the random access response window size (ra-ResponseWindowSize) for use in the PCell.

If no valid RAR is received, the UE retransmits the preamble in the SCell. If the random access procedure fails even with the predetermined number of preamble transmissions, the UE stops preamble transmission to avoid more uplink transmission in the SCell.

The UE transmits a random access preamble in a SCell and then monitors the PCell to receive an RAR in response to the preamble. If RAR is not received, the UE retransmits the random access preamble in the SCell.

If a valid RAR is received in the PCell at step 580, the UE applies the UL grant, TPC, and TA carried in the valid RAR to the uplink transmission in the second serving cell at step 585. In this case, the second serving cell is the serving cell in which the UE has transmitted the preamble other than the serving cell in which the RAR has been received.

The UE adjusts the transmission start timing of the uplink subframe n of the second serving cell to precede the start time (start boundary) of the downlink subframe n of the second serving cell as much as TA and increases or decreases the uplink transmission power of the second serving cell as much as an amount indicated by the TPC. The RAR includes 3-bit TPC as shown in Table 2.

TABLE 2

| TPC Command | Value (in dB) |
|---|---|
| 0 | −6 |
| 1 | −4 |
| 2 | −2 |
| 3 | 0 |
| 4 | 2 |
| 5 | 4 |
| 6 | 6 |
| 7 | 8 |

Typically, the TPC relates to the PUSCH transmission power control of the service cell in which the RAR is received. In the case that the UE capable of performing random access in multiple serving cells has transmitted a preamble in a sell, however, the TPC relates to the PUSCH transmission control of the second serving cell, i.e. the serving cell in which the preamble has been transmitter, other than the serving cell in which the RAR has been received.

The UE selects the transmission resource of the second serving cell for uplink transmission. The UE performs uplink transmission at step 590. As described above, if carrier aggregation is not configured for the UE, if carrier aggregation is configured but only one serving cell has uplink, or if carrier aggregation is configured with plural serving cells but only the PCell is allowed for random access, there is no need for a criteria to determine the cell to which the information carried in the RAR is applied. According to an exemplary embodiment of the present invention, the cell in which the RAR has been received is selected as the serving cell to which the information carried in the RAR is applied.

However, if the UE has transmitted a preamble in a SCell or if the UE is capable of performing random access in an SCell as well as a PCell, the aim of the random access procedure may not be accomplished. Unlike the case in which the UE having only one serving cell allowing for random access operates with the information carried in the RAR received in the serving cell without problem, the UE having multiple serving cell allowing for random access applies the information carried in the RAR received in the serving cell in which the preamble has been transmitted other than the serving cell in which the RAR has been received. This means that if the UE having multiple cells allowing for random access receives the RAR in response to a preamble transmitted in a SCell, the UE applies the TA, TPC, and UL grant carried in the RAR to the serving cell in which the preamble has been transmitted other than the serving cell in which the RAR has been received.

The UE performs Physical Uplink Shared Channel (PUSCH) transmission in cell to by applying the UL grant of the RAR at step 590. At this time, the UE controls the PUSCH transmission by applying the third maxHARQ-Tx acquired at step 565.

Figure 6:
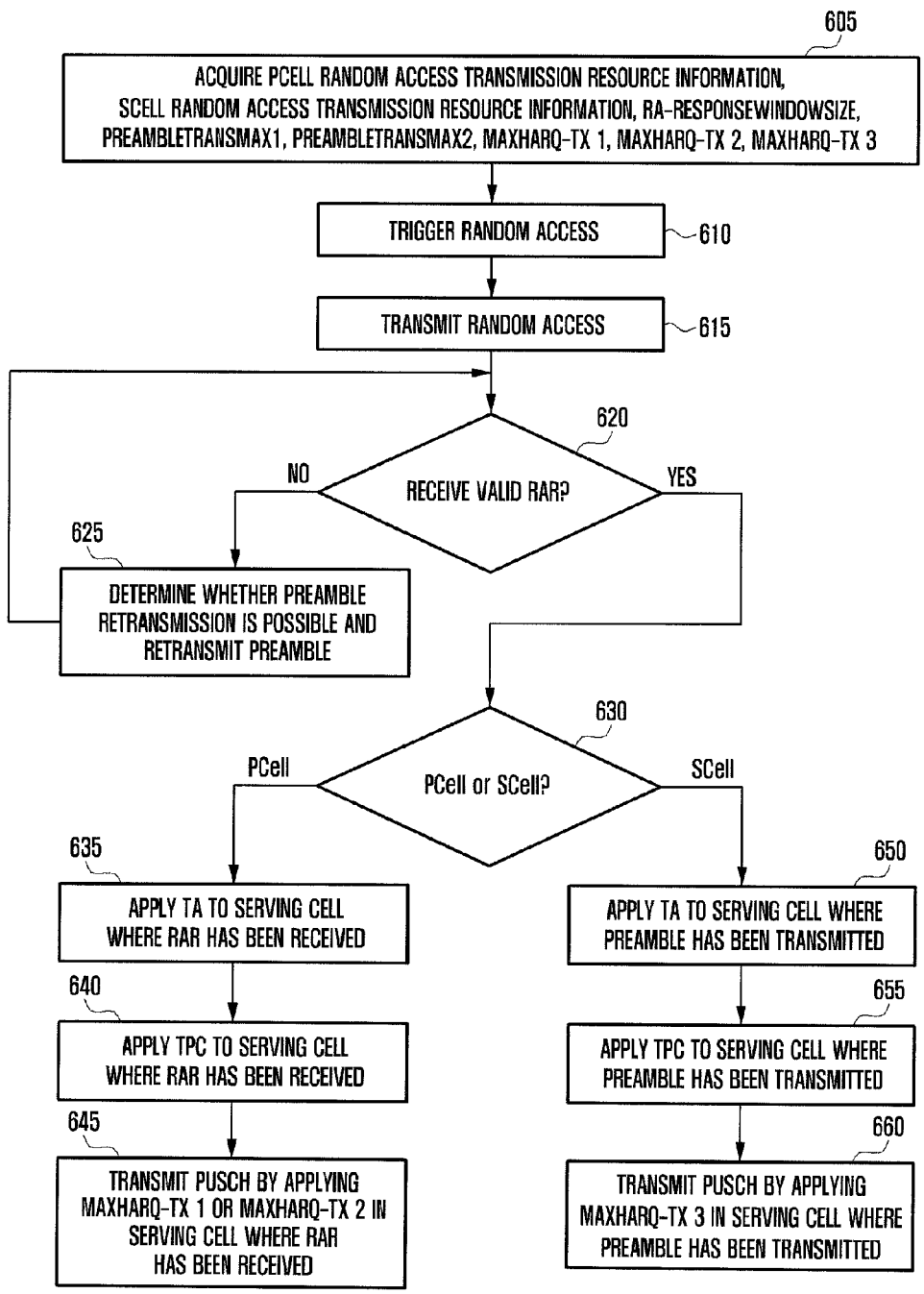
FIG. 6 is a flowchart illustrating a UE procedure of a transmission method according to an exemplary embodiment of the present invention.

FIG. 6 is a flowchart illustrating the UE procedure of the transmission method according to an exemplary embodiment of the present invention.

Referring to FIG. 6, the UE acquires random access-related information at step 605. The random access-related information may include Random access transmission resource information of PCell (prach-ConfigIndex, etc.), random access transmission resource information of SCell (prach-ConfigIndex, etc.), ra-ResponseWindowSize, preambleTransMax1, preambleTransMax2, maxHARQ-Tx 1, maxHARQ-Tx 2, and maxHARQ-Tx 3.

This information is acquired through various control message such as system information block and dedicated control message transmitted at different timings. For example, the PCell random access transmission resource information, ra-ResponseWindowSize, and preambleTransMax1 may be acquired through systeminformationblock2 of PCell, and maxHARQ-Tx 2 may be acquired through RRC Connection Setup message. The preambleTransMax2, maxHARQ-Tx 3 may be acquired through the RRC Connection Reconfiguration message for adding SCell.

A random access procedure is triggered at step 610. For example, the random access procedure may be triggered when data having a high priority occurs in the UE, when the eNB commands the UE to perform random access, or when the UE needs to reestablish RRC connection.

The UE determines the earliest valid PRACH occasion in the near future using the random access transmission resource information and transmits the preamble at the PRACH occasion at step 615. The preamble transmission power is configured in consideration of downlink path loss of the serving cell in which the preamble is transmitted.

The UE monitors the PDCCH of PCell to receive RAR in response to the preamble for a predetermined time duration at step 620. The time duration is ra-Window. If the preamble has been transmitted in the PCell, the maximum size of ra-Window is determined by applying ra-ResponseWindowSize acquired from the system information of the corresponding serving cell. If the preamble has been transmitted in SCell, the maximum size of ra-window is determined by applying the ra-ResponseWindowSize acquired in the system information of other serving cell (e.g. PCell) than the corresponding serving cell (i.e. SCell).

If a valid RAR is received during the ra-Window, the procedure goes to step 630. Otherwise, if a valid RAR is not received, the procedure goes to step 625. If a valid RAR has been received, then the UE has decoded the scheduling information with the RA-RNTI mapped to the transmission resource on which the UE has transmitted the preamble through the PDCCH of the PCell for the time duration of ra-Window and the ID of the RAR (RAPID) received according to the scheduling information matches the preamble transmitted by the UE.

If a valid RAR is not received during the ra-Window, the UE determines whether preamble retransmission is possible and, if so, retransmits the preamble at step 625, and returns the procedure to step 620. In the case of PCell, the preamble can be retransmitted until the number of preamble transmission times reaches preambleTransMax1. In the case of SCell, the preamble can be retransmitted until the number of preamble transmission times reaches preambleTransMax2.

The UE determines whether the cell in which the preamble has been transmitted is PCell or SCell at step 630. If the preamble has been transmitted in PCell, the procedure goes to step 635 and, otherwise, to step 650.

If the preamble has been transmitted in PCell, the UE applies TA to the serving cell in which RAR has been received at step 635. For example, the UE adjusts the uplink subframe boundary of the serving cell in which the RAR has been received to precede the downlink subframe boundary of the serving cell in which the RAR has been received as much as TA.

The UE sets the uplink transmission power of the serving cell using the TPC carried in the RAR at step 640. The UE calculates the PUSCH transmission power of the serving cell by summing the transmission power adjustment values indicated by the TPC.

The UE transmits the PUSCH in uplink of the serving cell, in which the RAR has been received, by applying uplink resource allocation information (UL grant) carried in the RAR at step 645. If the preamble transmitted at step 615 is dedicated preamble, the PUSCH is transmitted with the application of maxHARQ-Tx 2 and, otherwise if the preamble is random preamble, the PUSCH is transmitted with the application of maxHARQ-Tx 1.

If the preamble has been transmitted in SCell, the UE applies the TA to the serving cell in which the preamble has been transmitted other than the serving cell in which the RAR has been received at step 650. The UE moves up the uplink subframe boundary of the serving cell in which the preamble has been transmitted as much as TA as compared to the downlink subframe boundary of the serving cell in which the preamble has been transmitted. The uplink transmission timing is applied to the uplink transmission in all serving cells belonging to the same TA Group (TAG) as the serving cell in which the preamble has been transmitted.

The TAG is the group of at least one serving cell having the same uplink transmission timing. If the serving cells belonging to a TAG share the same uplink transmission timing, then the uplink transmission timings of the serving cells are identical with each other and the serving cells establishes or loses the uplink synchronization simultaneously. Furthermore, the uplink transmission timings are adjusted simultaneously.

TAG can be categorized into one of primary TAG and secondary TAG. The primary TAG is the TAG including the PCell, and the secondary TAG is the TAG including only SCells. The random access is permitted only in the PCell for the primary TAG and only in a predetermined SCell for the secondary TAG. If a SCell is added, the eNB notifies the UE whether the SCell belongs to the primary TAG or a secondary TAG and, if the SCell belongs to the secondary TAG, which secondary TAG the SCell belongs to.

The UE sets the uplink transmission power of the serving cell in which the preamble has been transmitted at step 615 using the TCP carried in the RAR at step 655. The UE calculates the PUSCH transmission power of the serving cell by summing the transmission power adjustment values indicated by TPC.

The UE transmits the PUSCH in uplink of the serving cell, in which the preamble has been transmitted, by applying the UL grant carried in the RAR in step 660. The PUSCH is transmitted with the application of maxHARQ-Tx 3.

Figure 7:
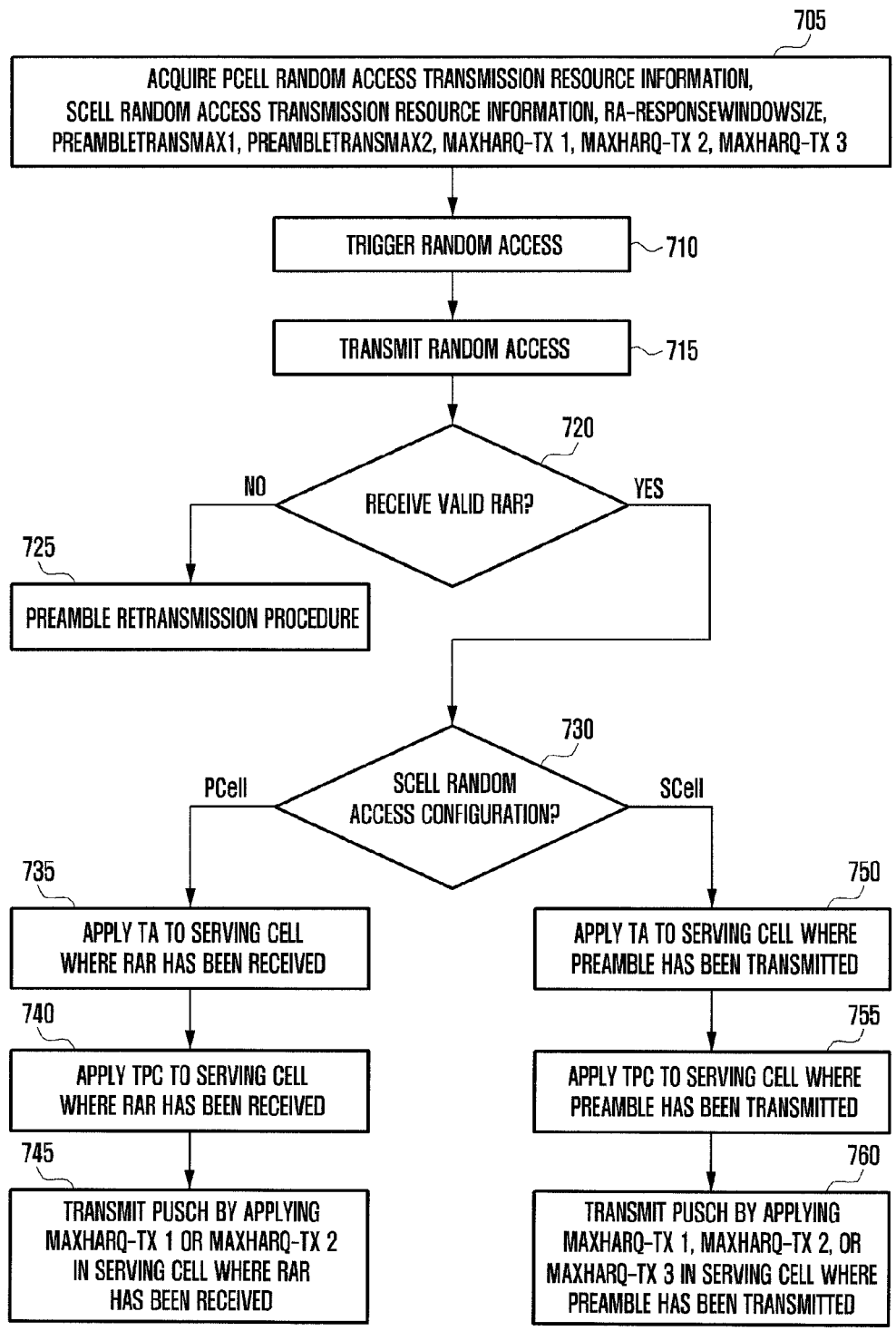
FIG. 7 is a flowchart illustrating the UE procedure of the transmission method according to another exemplary embodiment of the present invention.

FIG. 7 is a flowchart illustrating a UE procedure of a transmission method according to another exemplary embodiment of the present invention. Since steps 705, 710, 715, 720, and 725 of FIG. 7 are identical with steps 605, 610, 615, 620, and 625 of FIG. 6, detailed descriptions thereon are omitted herein.

Referring to FIG. 7, once a valid RAR has been received at step 720, the UE determines whether it is configured to perform the random access only in the PCell or both the PCell and SCell at step 730. If the UE is configured to perform the random access only in the PCell, the procedure goes to step 735 and, if the UE is configured to perform the random access in both the PCell and SCell, to step 750.

Since steps 735, 740, 745, 750, and 755 of FIG. 7 are identical with steps 635, 640, 645, 650, and 655 of FIG. 6, detailed descriptions thereon are omitted herein.

After applying the TPC at step 755, the UE transmits the PUSCH, in uplink of the serving cell in which the preamble has been transmitted, by applying the UL grant carried in the RAR at step 760. If the serving cell in which the preamble has been transmitted at step 715 is the PCell and if the preamble is the dedicated preamble, the PUSCH is transmitted with the application of maxHARQ-Tx 2 and, if the preamble is the random preamble, with the application of maxHARQ-Tx 3.

With the commercialization of various packet services, small packets are frequently generated sporadically. In the mobile communication systems including LTE system, it is inevitable to establish a signaling connection and data bearer in order to transmit a packet regardless of how small the packet is. In the above procedure, a large amount of control messages are exchanged.

If a connection to transmit/receive small amounts of data is established and released frequently, this is likely to cause overload in the network and accelerate battery power consumption of UE.

One approach to address this issue is that the UE stays in the connected state. However, if the UE with high mobility stays in the connected state, the frequent handover generates large amount of control message traffic between UE and eNB, between eNBs, and between eNB and Mobility Management Entity (MME) so as to lose the gain achieved by maintain the connected state. As a result, staying in the connected state is a strategy useful only when the UE has no data to be transmitted and/or received.

Since the UE mobility is managed by the eNB once the UE enters the connected state, the eNB estimates the velocity of the UE and determines whether to apply the strategy of staying in connected state based on the velocity of the UE. The velocity estimation may be performed after a predetermined duration elapses since the UE has entered the connected state. However, it may become necessary to determine whether to release or maintain the connection before starting velocity estimation. Furthermore, since the eNB may trigger DRX configuration according to the velocity of the UE, it is preferred for the UE to notify the eNB of the UE's velocity as soon as possible.

Another exemplary embodiment of the present invention proposes a method and apparatus for measuring and/or validating the mobility of the UE continuously in the state where the RRC connection with the eNB is released and, when the RRC connection is established, notifying the eNB of the RRC connection establishment.

Figure 8:
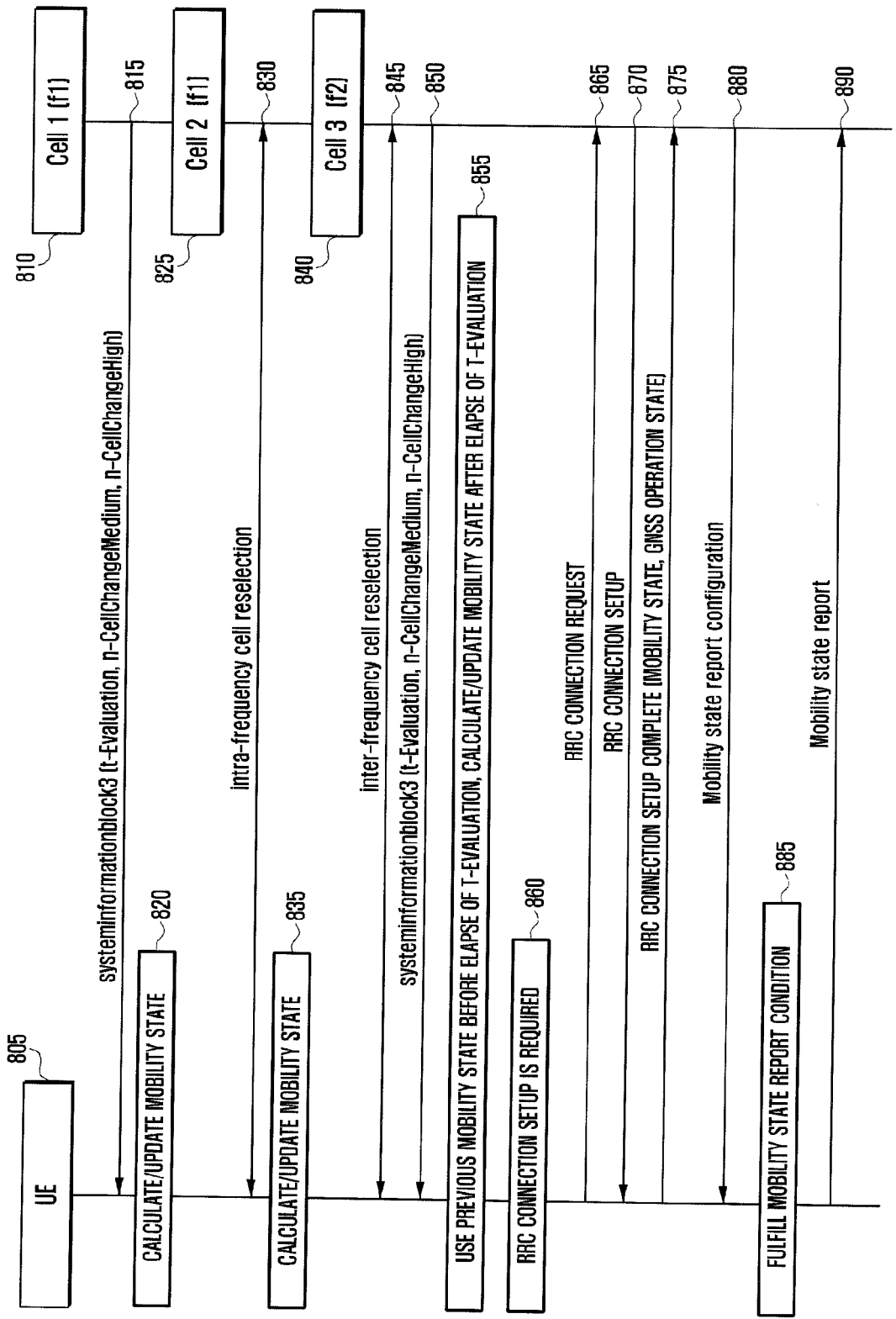
FIG. 8 is a signal flow diagram illustrating signal flows between a UE and the eNB according to another exemplary embodiment of the present invention.

FIG. 8 is a signal flow diagram illustrating signal flows between the UE and the eNB according to another exemplary embodiment of the present invention.

Referring to FIG. 8, if the system information block 3 (systeminformationblock3) is received in the current serving cell, e.g. cell 1 810 at step 815, the UE 805 in the state that the RRC connection has been released saves the parameters related to the mobility state that are included in the memory. The mobility state-related parameters include t-Evaluation, n-CellChangeMedium, and n-CellChangeHigh. This information is used for determining whether the mobility state of the UE is High-mobility state, Medium-mobility state, or Normal-mobility state.

If the number of cell changes (or number of cell reselections) during the t-Evaluation is equal to or greater than n-CellChangeHigh, the UE determines that its mobility state is High-mobility state. If the number of cell changes (or number of cell reselections) is less than n-CellChangeHigh and equal to or greater than n-CellChangeMedium, the UE determines that its state is Medium-mobility state. When these two conditions are not fulfilled, the UE determines that its state is Normal-mobility state.

The UE adjusts the cell reselection-related parameters based on the mobility state according to a predetermined rule. The method for adjusting the cell-reselection parameters is specified in TS36.304.

The UE determines its mobility state based on the above informations and, if necessary, update the mobility state at step 820. If the UE has the information on the UE's real velocity acquired from a location measurement system such as a Global Navigation Satellite System (GNSS), the UE is capable of the mobility state based on the real velocity information.

If a neighbor cell having the channel state better than that of the current serving cell is found at a certain time and the channel state is maintained over a predetermined duration, the UE performs cell reselection, i.e. reselects the neighbor cell 2 825 at step 830. If the old serving cell and the reselected serving cell operate on the same frequency, this cell reselection is referred to as intra-frequency cell reselection.

The parameters related to mobility state may be configured according to the network deployment. For example, the parameters may be configured according to the size of the cell deployed in a predetermined area. Since the cell size is determined depending on the frequency, if the UE performs intra-frequency cell reselection, the mobility state parameters are likely to be identical with those of the old serving cell. Accordingly, in the case of intra-frequency cell reselection, the UE is capable of calculating and updating the mobility state before receiving the system information block 3 (systeminformationblock3) in the newly selected cell at step 835. The UE increments the number of cell reselections for t-Evaluation NCR by 1 and determines the mobility state by applying the new NCR.

Afterward, the UE selects a new cell, e.g. cell 3 840, at step 845. If the new serving cell operates on a frequency different from that of the old serving cell, this cell reselection is referred to as inter-frequency cell reselection. In the case of inter-frequency cell reselection, the mobility state parameters of the new operation frequency is likely to differ from the mobility state parameters of the old operation frequency.

The UE receives the system information block 3 (systeminformationblock3) of the new cell at step 850 to update the mobility state parameters. The UE determines the mobility state based on the newly updated mobility state parameters. Once the mobility state parameters are updated, the UE updates tis mobility state as follows at step 855.

During the t-Evaluation arriving first after change of the mobility state parameters (i.e. before the mobility state in the new cell or on the new frequency), the UE maintains the mobility state used in the old serving cell (i.e. the most recent mobility state). The UE adjusts the cell reselection-related parameters by applying the mobility state on the old frequency. That is, the UE uses the mobility state used in the old cell but the cell reselection parameters (e.g. q-HystSF) received in the current cell. If the mobility state is determined based on the new mobility state parameters due to the elapse of the t-Evaluation, the UE adjusts the cell reselection parameters by applying the new mobility state.

If it becomes necessary to establish an RRC connection at a certain time at step 860, the UE sends the eNB an RRC Connection Request message at step 865 and receives an RRC Connection Setup message from the eNB at step 870.

The UE sends the eNB a RRC Connection Setup Complete message including the mobility state at step 875. The UE may reports only the mobility state or the mobility state, t-Evaluation, and NCR used in determining the current mobility state. The UE may report the information on whether GNSS is operating currently and real velocity of the UE which has been measured with the assistance of the GNSS. The mobility state can be updated quickly and precisely with the assistant of the GNSS. The eNB is capable of configuring the UE to determine the mobility state continuously with the assistance of GNSS and reports the result when a predetermined condition is fulfilled. For example, the eNB sends a control message for configuring the mobility state report to the UE which has reported the assistance of GNSS at step 880. This control message may include the information instructing to report the mobility state when the mobility state changes or when the velocity of the UE maintains a level higher than a predetermined threshold value over a predetermined duration.

If the mobility state report condition is fulfilled at step 885, the UE generates an RRC control message to report the mobility state 2 to the eNB at step 890.

The eNB adjusts the DRX period to be applied to the UE (e.g. shortens the DRX period when the UE velocity is higher than a predetermined threshold) or releases the RRC connection (e.g. releases the RRC connection when it is predicted that handover occurs frequently if the RRC connection is maintained, based on the reported UE velocity).

Figure 9:
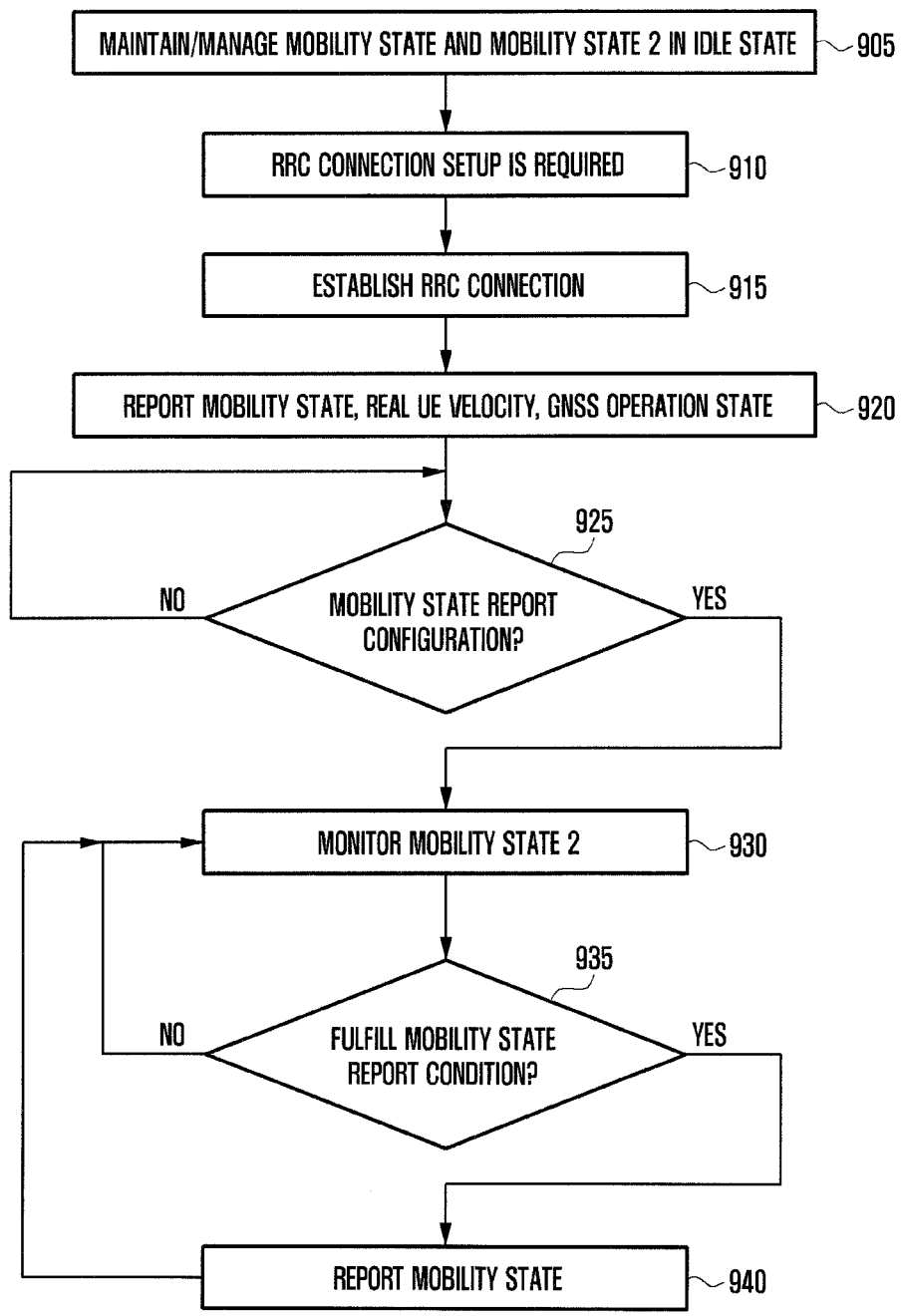
FIG. 9 is a flowchart illustrating UE procedure in a method according to an exemplary embodiment of the present invention.

FIG. 9 is a flowchart illustrating UE procedure in the method according to an exemplary embodiment of the present invention.

Referring to FIG. 9, the UE in idle state acquires the mobility state parameters in the system information of the serving cell and maintains/manages the mobility state at step 905. If the velocity of the UE is measured with the assistance of GNSS or GPS, the UE also maintains/manages the UE velocity. The UE adjusts the cell reselection parameters in consideration of the mobility state.

If it is required to establish an RRC connection at a certain time at step 910, the UE establishes an RRC connection in the current serving cell at step 915. Once the RRC connection setup has completed (or during the RRC connection setup procedure), the UE reports the following information to the eNB at step 920:
 Mobility state maintained and managed in idle state and related information
 Real velocity of UE (only when the UE velocity acquired with assistance of GNSS is recorded)
 GNSS operation-related information, e.g. current operation and past operation history The UE monitors to receive a mobility state report configuration message at step 925 and, if the message is received, the UE monitors the mobility state at step 930. The mobility state report configuration message includes the following information:
 Mobility state determination criteria: velocity_high and velocity_medium
 Reference velocity for triggering mobility state report: if the UE's velocity higher equal to or higher than the reference velocity is maintained over a predetermined duration, the UE reports mobility state.

If the velocity, which is measured with the assistance of GNSS, is equal to or higher than velocity_high and is maintained over a predetermined duration, the UE determines that the mobility state 2 is high-mobility state. If the velocity lower than the velocity_high and equal to or higher than velocity_medium is maintained over a predetermined duration, the UE determines that the mobility state 2 is medium-mobility state.

If the GNSS is activated, the UE determines current mobility state based on the current velocity. If the mobility state report condition is fulfilled at step 935, the UE generates a mobility state report message to report the new mobility state to the eNB at step 940. For example, the mobility state report condition may be fulfilled when the current mobility state differs from the previous mobility state. Also, the mobility state report condition may be fulfilled when the current velocity is higher than a predetermined reference velocity.

Figure 10:
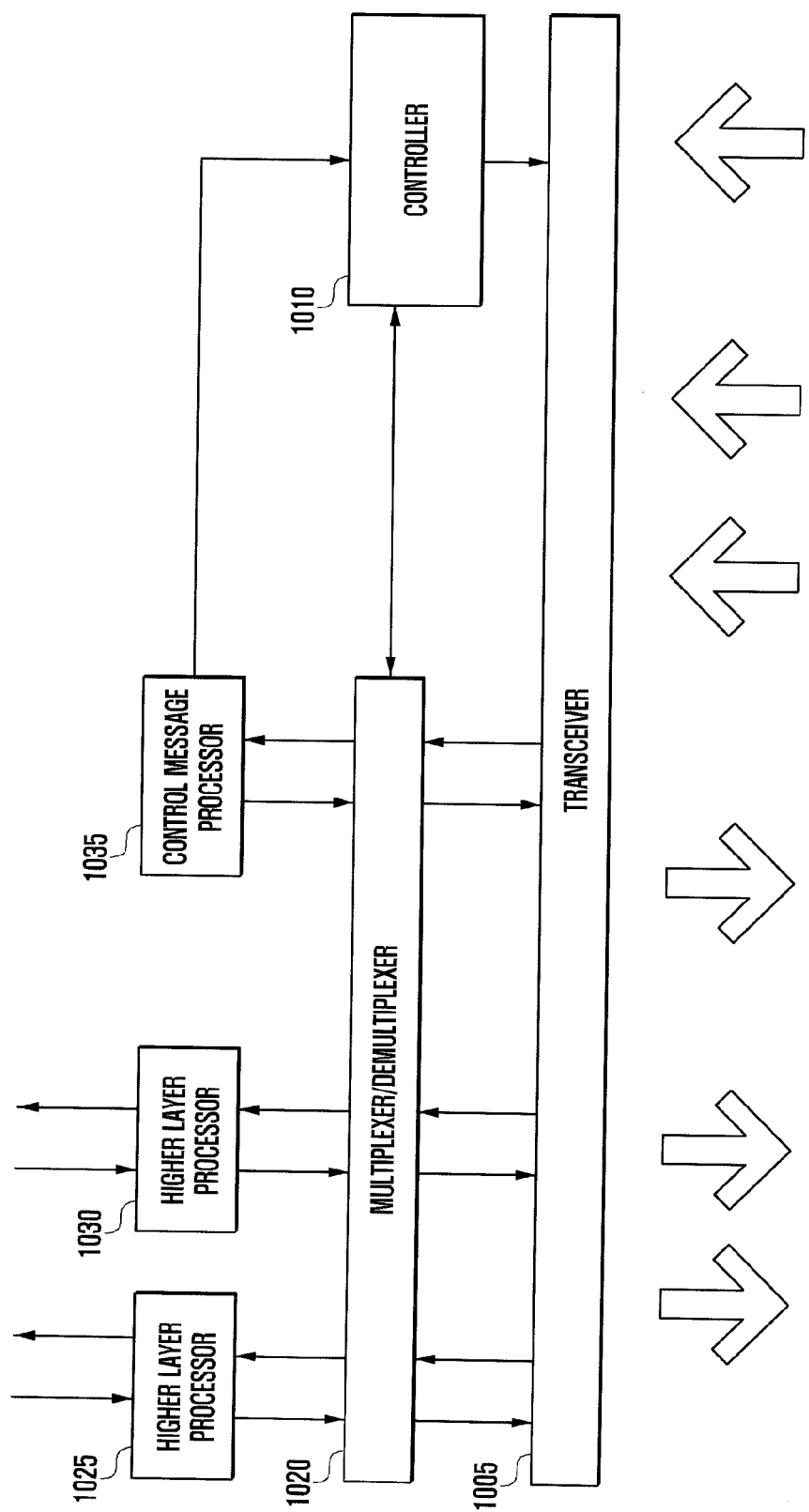
FIG. 10 is a block diagram illustrating a configuration of a UE according to an exemplary embodiment of the present invention.

FIG. 10 is a block diagram illustrating a configuration of the UE according to an exemplary embodiment of the present invention.

Referring to FIG. 10, the UE includes a transceiver 1005, a controller 1010, a multiplexer/demultiplexer 1020, higher layer processors 1025 and 1030, and a control message processor 1035.

The transceiver 1005 receives data and control signals through a downlink channel of the serving cell and transmits data and control signal through an uplink channel. In the case that multiple serving cells are configured, the transceiver 1005 is capable of transmitting and receiving data con control signals through multiple serving cells.

The multiplexer/demultiplexer 1020 multiplexes the data generated by the higher layer processors 1025 and 1030 and the control message processor 1035 and demultiplexes the data received by the transceiver 1005 to deliver the demultiplexed data to appropriate processors, i.e. the higher layer processors 1025 and 1030 and the control message processor 1035.

The control message processor 1035 processes the control message received form the eNB to takes an appropriate action. For example, if DRX-related parameters are received, the control message processor 1035 delivers these parameters to the controller 1010.

The higher layer processor 1025 or 1030 is configured per service to process the data generated by a user service such as File Transfer Protocol (FTP) and Voice over Internet Protocol (VoIP) and transfer the processed data to the multiplexer/demultiplexer 1020, processes the data from the multiplexer/demultiplexer 1020, and delivers the processed data to the service application running on the higher layer.

The controller 1010 analyzes the scheduling command, e.g. uplink grant, received by the transceiver 1005 and controls the transceiver 1005 and the multiplexer/demultiplexer 1020 to perform uplink transmission with appropriate transmission resource at appropriate timing. The controller 1010 controls the random access procedure and the mobility state management procedure. The controller 1010 may control the operations associated with the UE as described with reference to FIGS. 5, 6, 7, 8, and 9.

The controller 1010 controls the random access procedure in the primary cell (PCell). The controller 1010 detects the random access trigger in a secondary cell (SCell) and receives the information necessary for performing random access to the SCell from the PCell. The controller 1010 transmits a preamble to the SCell based on the received information and controls the UE to monitor the primary cell to receive a Random Access Response for the SCell.

In this case, the information for use in the random access to the SCell may include the maximum preamble transmission times or random access transmission resource information. The control unit 1010 controls the UE to monitor to receive the random access response for the SCell using the random access response window size set for use in the PCell.

If no valid Random Access Response for the SCell is received in a predetermined time, the controller 1010 controls the UE to retransmit the preamble in the SCell and, if a valid Random Access Response is received, controls the UE to transmit/receive data in the SCell based on the information carried in the Random Access Response.

Figure 11:
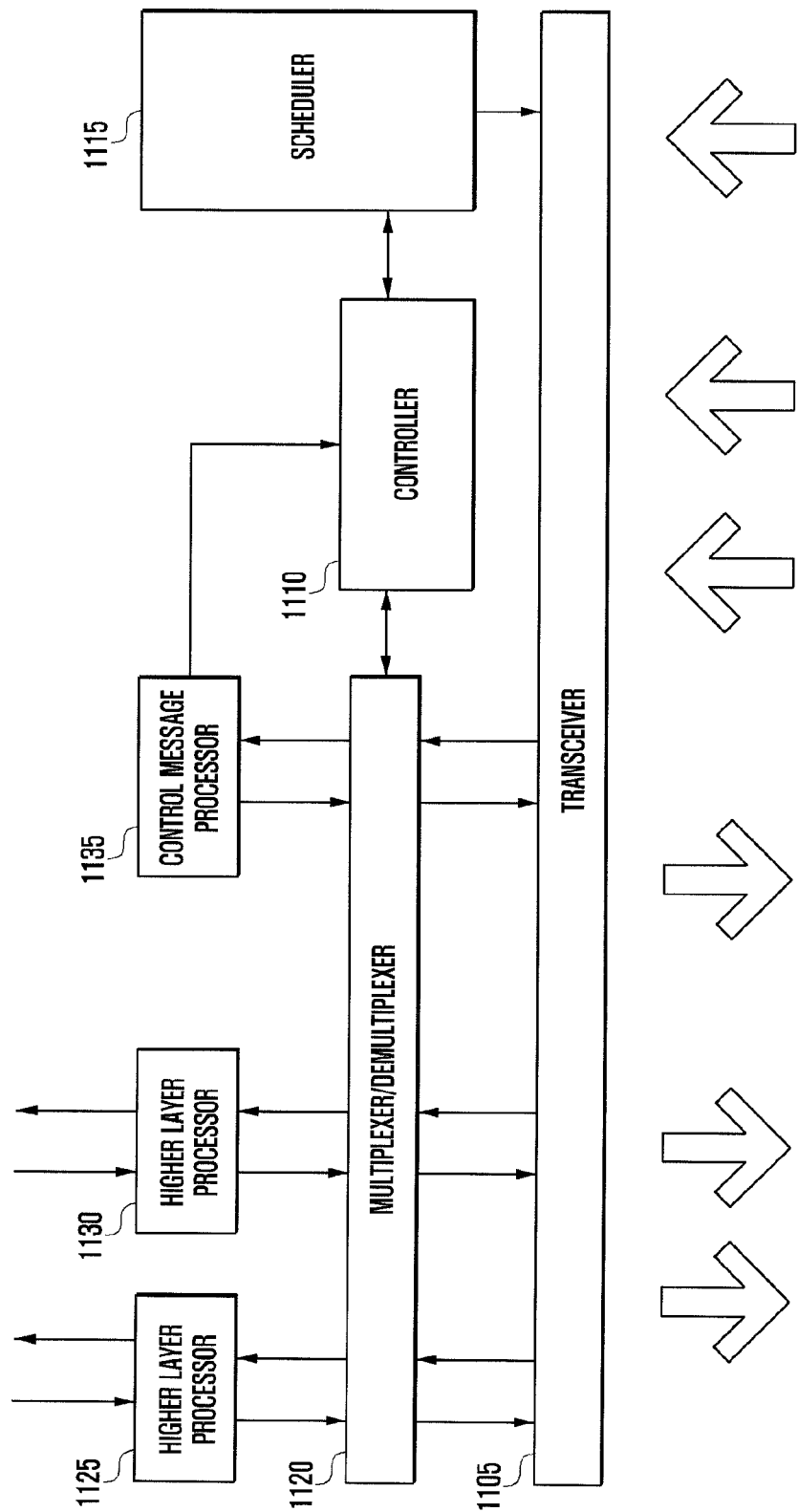
FIG. 11 is a block diagram illustrating a configuration of an eNB according to an exemplary embodiment of the present invention.

FIG. 11 is a block diagram illustrating a configuration of the eNB according to an exemplary embodiment of the present invention.

Referring to FIG. 11, the eNB according to an exemplary embodiment of the present invention includes a transceiver 1105, a controller 1110, a multiplexer/demultiplexer 1120, various higher layer processors 1125 and 1130, a scheduler 1115, and a control message processor 1135.

The transceiver 1105 transmits data and control signals on a downlink carrier and receives data and control signals on an uplink carrier. In the case that multiple carriers are configured, the transceiver 1105 transmits and receives the data and control signals on the multiple carriers.

The multiplexer/demultiplexer 1120 multiplexes the data generated by the higher layer processor 1125 and 1130 and the control message processor 1135 and demultiplexes the data received by the transceiver 1105 to deliver the demultiplexed data to at least one of the higher layer processors 1125 and 1130 and the control message processor 1135 and the controller 1110. The control message processor 1135 processes the message transmitted by the UE and takes a necessary action or generates a control message to be transmitted to the UE to the higher layer.

The higher layer processor 1125 or 1130 is configured per bearer to process the data received from the S-GW or other eNB and generate RLC PDU to the multiplexer/demultiplexer 1120 and processes the RLC PDU from the multiplexer/demultiplexer 1120 and generates PDCP SDI to the S-GW or other eNB.

The scheduler 1115 allocates transmission resource to the UE at an appropriate time in consideration of the buffer status of the UE, channel status, and active time of the UE; and controls the transceiver to process the signals transmitted by the UE or to be transmitted to the UE.

The controller 1110 controls the random access procedure and mobility state management procedure. The controller 1110 controls the operations associated with the UE as described with reference to FIGS. 5, 6, 7, 8, and 9.

As described above, a data transmission method and apparatus according to exemplary embodiments of the present invention is advantageous in performing random access in SCells by reusing a part of the information configured for use in the PCell and furthermore in improving SCell random access efficiency through the PCell information reuse. Also, a data transmission method and apparatus according to exemplary embodiments of the present invention is capable of improving SCell uplink performance and minimizing UE complexity.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A random access method of a terminal in a mobile communication system supporting carrier aggregation, the method comprising:
   transmitting a first random access preamble on a primary cell;
   monitoring, on the primary cell, a first control message of a first random access response for the first random access preamble;
   transmitting a first physical uplink shared channel (PUSCH) on the primary cell according to a first uplink grant and a first uplink transmission time adjustment included in the first random access response;
   receiving a configuration message associated with a secondary cell on the primary cell;
   transmitting a second random access preamble on the secondary cell;
   monitoring, on the primary cell, a second control message of a second random access response for the second random access preamble; and
   transmitting, if the second random access response for the second random access preamble is received on the primary cell, a second PUSCH on the secondary cell according to a second uplink grant and a second uplink transmission time adjustment included in the second random access response.

2. The method of claim 1, further comprising:
   receiving information for a secondary cell random access on the primary cell,
   wherein the information received on the primary cell includes at least one of a maximum number of preamble transmissions and random access transmission resource information.

3. The method of claim 1, wherein the monitoring of the second control message on the primary cell comprises determining whether the second random access response for the secondary cell is received in a random access response window which is used for the primary cell.

4. The method of claim 1, further comprising retransmitting, after the monitoring of the second control message, the second random access preamble for the secondary cell if a valid random access response is not received during a predetermined time period.

5. The method of claim 1, further comprising transmitting, after the monitoring of the second control message, data on the secondary cell if the random access response for the secondary cell is valid.

6. The method of claim 1, wherein the second random access response includes a transmission power control command for the secondary cell.

7. The method of claim 1, further comprising:
   receiving a third control message to initiate a random access for the secondary cell after receiving the configuration message.

8. A terminal for performing random access in a mobile communication system supporting carrier aggregation, the terminal comprising:
   a transceiver configured to transmit and receive control information and data with at least one cell; and
   a controller configured to:
      control the transceiver to transmit a first random access preamble on a primary cell,
      monitor, on the primary cell, a first control message of a first random access response for the first random access preamble,
      control the transceiver to transmit a first physical uplink shared channel (PUSCH) on the primary cell according to a first uplink grant and a first uplink transmission time adjustment included in the first random access response,
      control the transceiver to receive a configuration message associated with a secondary cell on the primary cell, control the transceiver to transmit a second random access preamble on the secondary cell, monitor, on the primary cell, a second control message of a second random access response for the second random access preamble, and control the transceiver to transmit, if the second random access response for the second random access preamble is received on the primary cell, a second PUSCH on the secondary cell according to a second uplink grant and a second uplink transmission time adjustment included in the second random access response.

9. The terminal of claim 8,
wherein the controller is further configured to control the transceiver to receive information for a secondary cell random access on the primary cell, and wherein the information received on the primary cell includes at least one of a maximum number of preamble transmissions and random access transmission resource information.

10. The terminal of claim 8, wherein the controller is further configured to determine whether the second random access response for the secondary cell is received in a random access response window which is used for the primary cell.

11. The terminal of claim 8, wherein the controller is further configured to control the transceiver to retransmit, after monitoring the second control message, the second random access preamble for the secondary cell if a valid random access response is not received during a predetermined time period.

12. The terminal of claim 8, wherein the controller is further configured to control the transceiver to transmit, after monitoring the second control message, data on the secondary cell if the random access response for the secondary cell is valid.

13. The terminal of claim 12, wherein the second random access response includes a transmission power control command for the secondary cell.

14. The terminal of claim 8, wherein the controller is further configured to control the transceiver to receive a third control message to initiate a random access for the secondary cell after receiving the configuration message.

* * * * *